United States Patent [19]

Peris

[11] 4,226,322
[45] Oct. 7, 1980

[54] MACHINE TOOL GUARD DOOR ASSEMBLY

[75] Inventor: John M. Peris, Horseheads, N.Y.

[73] Assignee: Hardinge Brothers, Inc., Elmira, N.Y.

[21] Appl. No.: 925,397

[22] Filed: Jul. 17, 1978

[51] Int. Cl.³ .............................................. F16P 3/08
[52] U.S. Cl. .................................. 192/135; 192/129 B
[58] Field of Search ................. 49/13, 14; 192/129 B, 192/133, 134, 135, 136; 160/202

[56] References Cited

U.S. PATENT DOCUMENTS

| 2,280,368 | 4/1942 | Bassett | 160/202 |
| 3,805,658 | 4/1974 | Scott | 192/135 X |
| 4,106,607 | 8/1978 | Badavas | 192/135 X |

FOREIGN PATENT DOCUMENTS 812466  4/1959  United Kingdom ..................... 192/134

Primary Examiner—Allan D. Hermann
Attorney, Agent, or Firm—Shlesinger, Arkwright, Garvey & Dinsmore

[57] ABSTRACT

An automatic programmed machine tool having guard doors is shut down by an interlock system whenever a guard door is opened.

8 Claims, 7 Drawing Figures

MACHINE TOOL GUARD DOOR ASSEMBLY

BACKGROUND OF INVENTION

This invention relates to machine tool guard door assemblies, and particularly to a guard door assembly for an automatically operated machine tool.

With the use of programmed machine tools where many machines are in simultaneous operation and attended by a single operator, the need has arisen for safety guard doors. It has also been found that such door systems should be tied into the machine operation to prevent inadvertent use of the machines without having the doors closed. Further, it has also been found that in some instances machine operators may deliberately bypass such safety operation systems to save time and effort in going from machine to machine. In both cases these situations have presented serious safety hazards.

Accordingly, this invention is directed to the design of an improved guard door system in which the prior limitations of guard door systems are obviated.

FEATURES AND ADVANTAGES OF THE INVENTION

A principal feature of this invention is the provision of a safety guard door interlock system for a machine tool in which open guard doors will preclude the machine from operation.

Another feature of this invention is the provision of a readily usable guard door system in which the guard doors are easily slidable from an open to a closed position or vice versa.

A further feature of this invention is the provision of a safety interlock system which is inaccessible to the operator.

Another feature of this invention is the provision of a safety guard door interlock system which cannot be bypassed.

A still further object of this invention is the provision of a multiple guard door system which permits the operator to move only that portion of the protective guard door assembly required for the specific task at hand.

A further object of this invention is to provide a simplified sensing assembly for shutting down the machine tool whenever a guard door is opened.

It is a still further feature of this invention to provide a guard door assembly which is explosion proof.

Yet another feature of this invention is to provide a relatively service-free automatic shutdown guard door assembly.

A still further feature of this invention is the provision of a new type of pneumatic control sensing arrangement for guard door assemblies.

DESCRIPTION OF THE INVENTION

Figure 1:
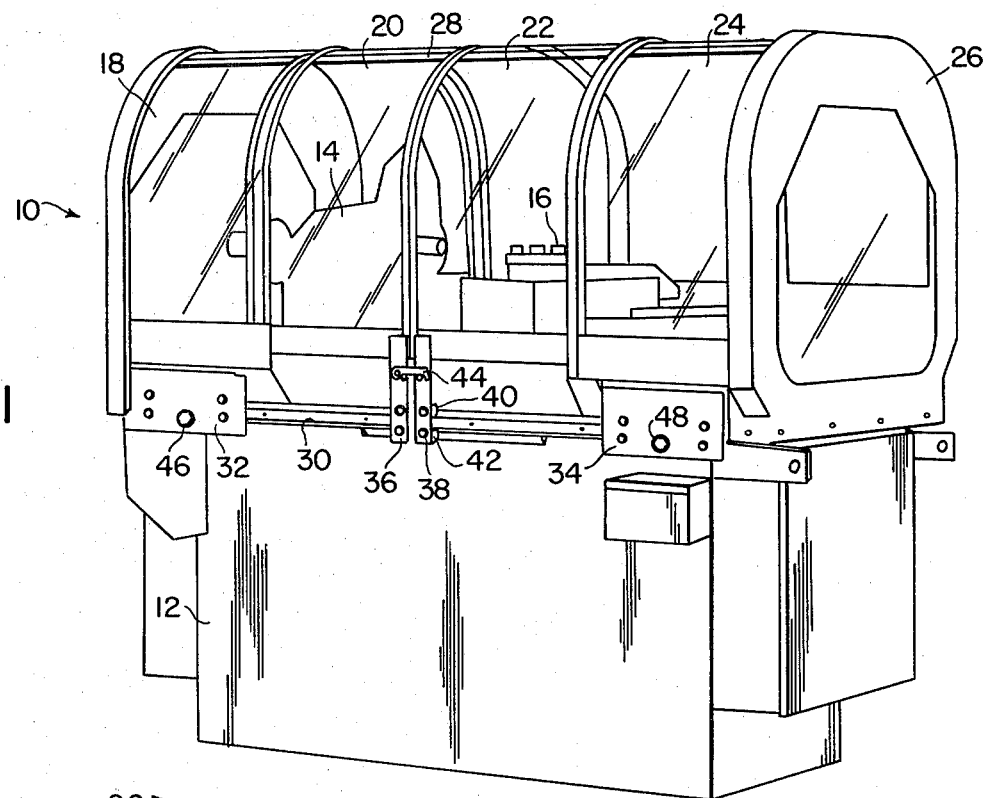
FIG. 1 is a perspective view of an automatic machine tool showing the guard door assembly.

Referring particularly to FIG. 1, the machine tool generally indicated at 10 has a base 12 and a spindle assembly 14 facing an indexible turret 16. Horizontally slidable guard doors 18, 20, 22 and 24 having clear plastic curved panels are positioned over the panel assembly for safety and to keep out dust, as well as keeping metal chips from the work from leaving the machine tool.

The doors, when closed, permit the operation of the machine with no concern with respect to accidents while the machine is in operation. The operator can clearly see the progress of the work and make ordinary inspections with regard to this without having to open the guard doors. The guard doors readily move in a horizontal fashion. They are supported on rollers and are supported at the top from transverse movement by a guide rail 28. The guard rail is supported at each end by end panels 26.

The mounting and support arrangement for the guard doors is similar on both the front and back sides of the unit. A support rod 30 extends the length of the unit. It has at one end a carriage 32 which supports left guard door 18, and a carriage 34 at its other end which supports right guard door 24. The intermediate central doors have single roller pair mounting pieces on roller assembly 36 for guard door 20, and on roller assembly 38 for guard door 22. The construction of assemblies 36 and 38 are identical and include, as shown for assembly 38, an upper roller 40 and a lower roller 42, each of which have concave surfaced rollers disposed against each other and engaging the rod 30. A latch 44 attached to the assemblies 36 and 38 will hold the guard doors 20 and 22 in closed position.

A push spring-biased engaging latch 46 is mounted on the two pair roller assembly 32 for guard door 18. A similar type of latch 48 is mounted on the two pair roller assembly support 34 for guard door 24.

Figure 3:
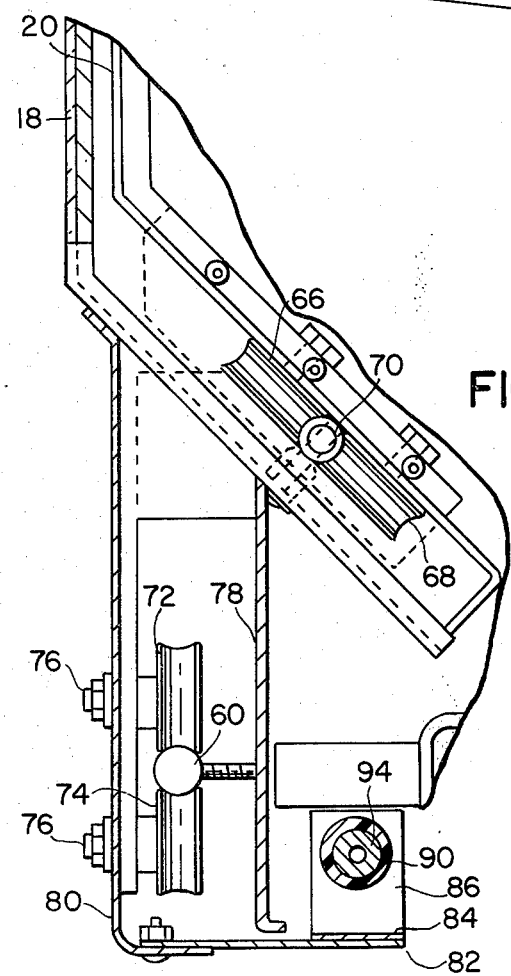
FIG. 3 is a partial section along line 3—3 of FIG. 2 of the guard door support assembly.
Figure 2:
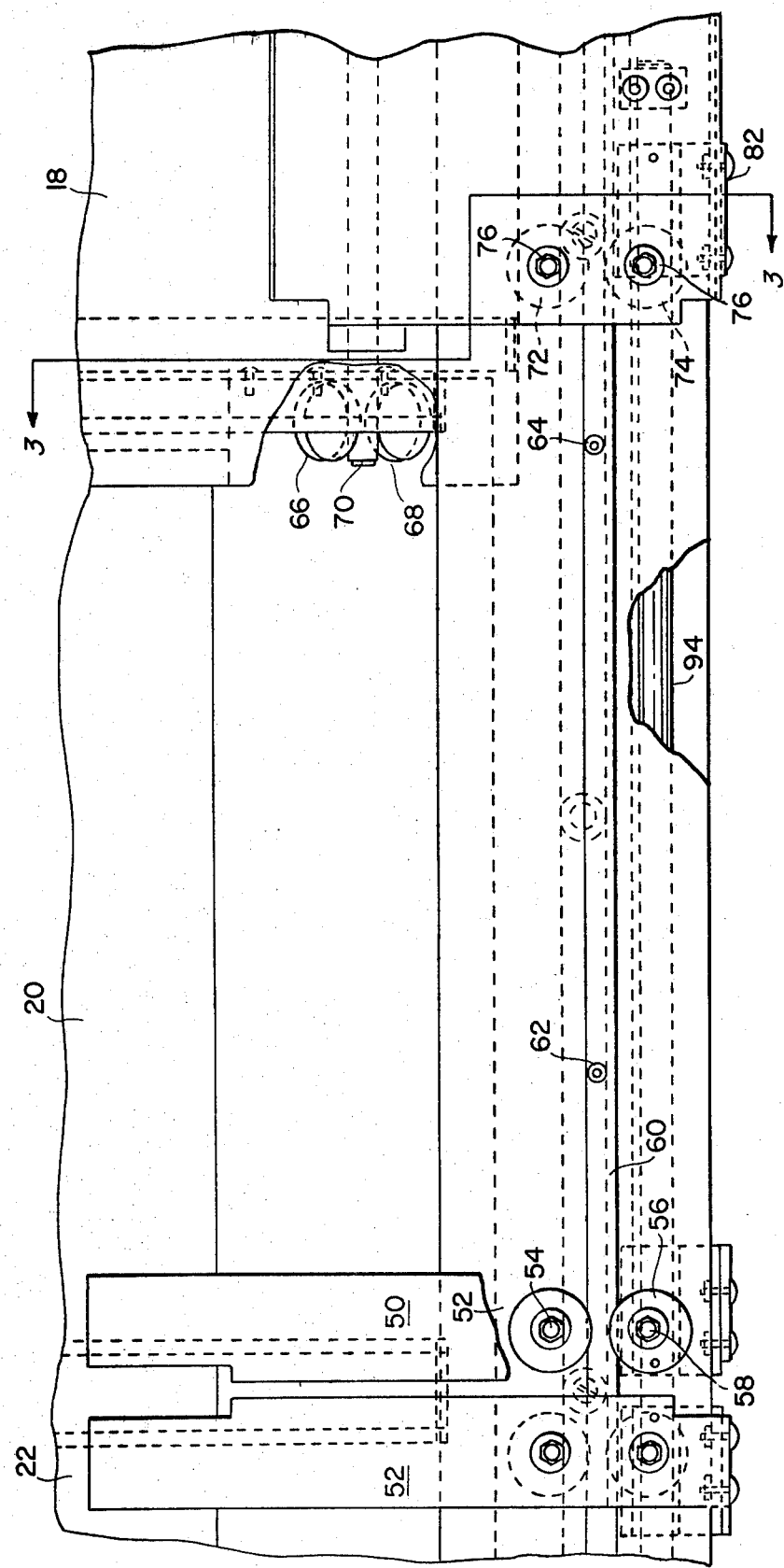
FIG. 2 is a partial back view of the guard door assembly.

FIGS. 2 and 3 show in further detail the construction of the support and roller assemblies. These figures show the rear side of the machine. The roller assemblies are identical for both the front and back of the machine. In addition, these figures also disclose the sensing assembly which is only located on the rear side of the machine so as to be inaccessible to the operator.

Referring to these drawings, and particularly to FIG. 2, it will be seen that the rear of the inner doors 20 and 22 are supported by upright pieces 50 and 52 which support rollers for supporting the rear side of the guard panels. Bracket and roller assembly 50 is cut away to show how upper roller 54 and lower roller 56 engage the support rod 60. Each are fastened in alignment by a nut and washer 58 to the upright frame piece 50. The rollers are in engagement with the support rod 60 which is supported by outwardly extending horizontal pieces 62 and 64. The rod 60 extends the length of the machine.

For both the inner doors 20 and 22, there is an interior support assembly adjacent doors 18 and 24, respectively. They each have a roller assembly similar to that shown in FIG. 2. Rollers 66 and 68 engage a short separate support rod 70 disposed interiorly of support rod 60. FIG. 3 shows this assembly and the manner of mounting the rollers. The rollers are fastened to the doorframe of guard door 20 which is a metal piece which also provides support for the clear plastic curved window.

Figure 4:
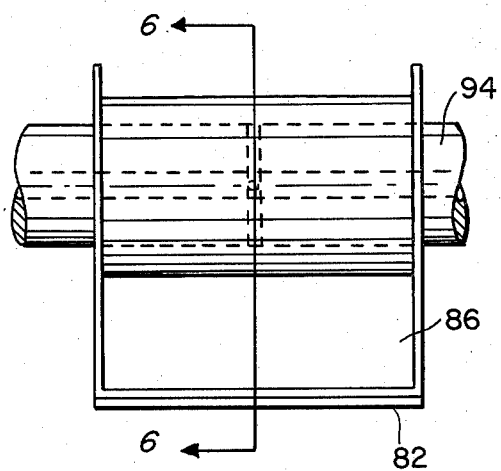
FIG. 4 is a side view of the sensing bushing assembly.
Figure 5:
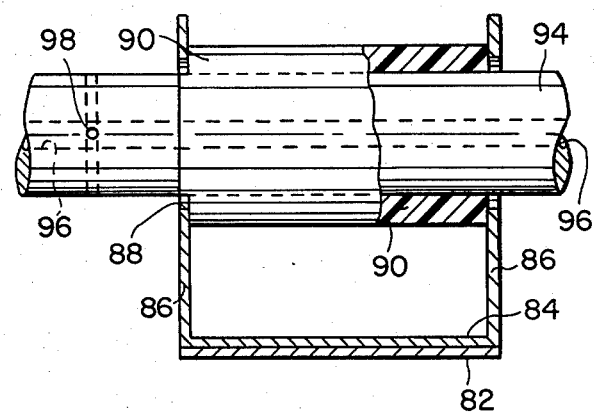
FIG. 5 is a longitudinal sectional view of the bushing assembly of FIG. 4.
Figure 6:
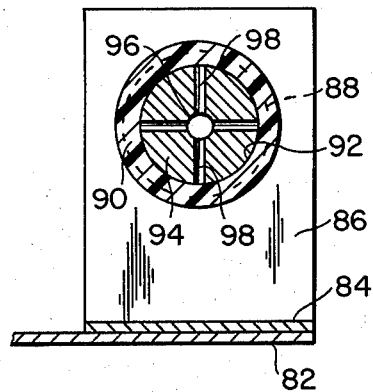
FIG. 6 is a sectional view taken along line 6—6 of FIG. 4.

In FIG. 3 the lower assembly of rollers for the end door 18 is shown. The assembly is a two-pair roller assembly. Upper roller 72 and lower roller 74 engage the support rod 60 and are respectively fastened to the lower frame 80 by a bolt and nut 76. The interior frame member 78 supports the sensing bushing assembly as shown in FIG. 3. It is composed of the lower plate 82 on which the bracket having a central section 84 is spot-welded. It has upstanding edges 86. Further construction and arrangement of the sensing assembly is shown in FIGS. 4 through 6. The upstanding pieces 86 have circular cut-out portions 88 and contact the edges of the guide bushing 90 which has an internal bore 92. It loosely fits over the rod 94 with a small clearance of approximately one to three thousandths of an inch. The activating rod 94 has an internal bore 96 through which air and pressure is supplied at one end. The other end of the activating rod which extends the length of the machine is capped such that there is always air under pressure within the rod. A number of cross drilled passages 98 extend from the outer surface and through the central passage 96 to provide a plurality of four openings 98. These are spaced for the closed position of each of the four safety doors. When the guide bushing is in position over the openings there is very little air loss. However, when the door is moved the guide is moved also uncovering the openings and resulting in substantial pressure loss. This loss is picked up by a pressure sensitive switch 100 connected to the tubing at the open end of the activating rod.

In FIG. 6 the section is shown in the clearance of the bracket periphery 88 of each upstanding bracket 86 such that it does not engage the activating rod 94 but merely presses lightly against the end faces of the bushing 90. The bushing is made of Nylon and slides easily with no binding along the length of the rod along with the individual door to which it is integrally connected.

Figure 7:
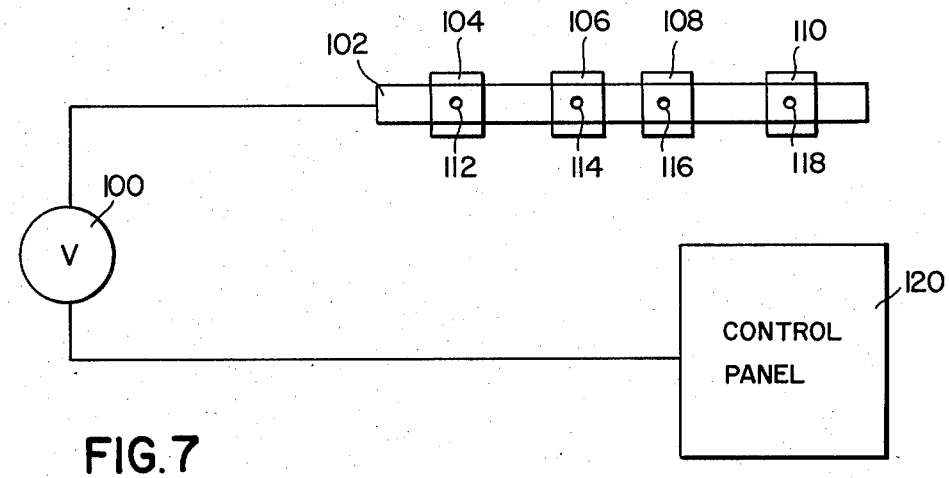
FIG. 7 is a schematic diagram of the control and sensing assembly.

FIG. 7 illustrates the arrangement of the activating rod in a schematic fashion. The pressure sensitive switch 100 is connected through tubing to the open end of the activating rod 102 which has slidably mounted thereon four Nylon sleeves 104, 106, 108 and 110, each of which covers their respective plural openings located at 112, 114, 116 and 118. When any one of these sleeves is moved out of position to expose the openings there is a substantial pressure drop on the order of four to six pounds per square inch which is picked up by the pressure sensitive switch which translates it into an electrical control signal which is relayed to the control panel 120. The control panel 120 on receiving the signal shuts down the control apparatus which contains the program for the unit.

OPERATION

When the machine tool is in operation, all of the doors are closed and their respective Nylon sleeves cover the openings to the interior passageways of the activating rod. Inasmuch as there is no pressure loss there is no shutdown signal given by the pressure sensitive valve 100 to the program control in the control panel 120.

The activating rod is located at the rear of the machine inaccessible to the operator so that there is no possibility of the operator cutting off the shutdown mechanism.

Each of the four guard door canopies has a transparent plastic material which is U-shaped to provide a canopy and cover for the machine tool working area. Each door is individually slidable and individually locked in position by either the pull type knobs 46, 48 on the end doors, or the latch 44 which locks the inner doors 20 and 22 together. The doors are readily slidable inasmuch as they are mounted on a relatively friction-free roller assembly.

The doors move smoothly in a horizontal direction, each door having four point support by four separate pairs of concave surface rollers which engage the horizontal support rail. The inner doors are disposed to telescope within the outer doors 18 and 24 and have the outer corners supported by rollers disposed on a separate support rod 70. The roller assembly is designed to move very easily with little resistance such that there is little effort required on the part of the operator to move any one of the four doors. It should be noted that each of the doors can be moved separately from any one of the other doors, eliminating the need for the operator to move more of the canopy than is necessary for the access he requires.

With respect to the activating sleeve mounted on the activating rod, it should be noted that it moves freely and is merely pushed along the activating rod. A slight clearance of from one to three thousandths permits easily slidable movement and inasmuch as there is no rigid connection with this bushing to any of the doors, there is no chance of binding due to misalignment. Because of the air pressure the bushing almost floats freely.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A guard door assembly for a machine tool, comprising-
   (a) a support on which a headstock assembly and machine tool turret assembly are mounted and including two spaced horizontal support rods along the front and rear top surface of the support, at least one of which has a central pneumatic passage and is connected to a pneumatic source
   (b) a plurality of transparent movable guard doors slidably mounted on the support rods and enclosing the headstock and machine tool turret assemblies
   (c) operating means for operating the machine tool
   (d) sensing means for sensing when the guard doors are opened
   (e) deactivating means associated with the sensing means for automatically deactivating the operating means when the guard doors are opened, and
   (f) the sensing means having an element which pneumatically co-acts with one of the support rods and which is both inaccessible to the operator and gives no outward appearance of its function.

2. The guard assembly for a machine tool as set forth in claim 1, wherein:
   (a) the sensing means is operable when any one of the guard doors are opened.

3. The guard door assembly for a machine tool as set forth in claim 1, wherein:
 (a) the sensing means is explosion proof.

4. The guard door assembly for a machine tool as set forth in claim 1, wherein:
 (a) the sensing means is fluid operated and pressure responsive.

5. The guard door assembly for a machine tool as set forth in claim 4, wherein:
 (a) the guard doors are slidably mounted for horizontal movement
 (b) the sensing means includes an assembly within an elongated activating rod having a central passage which is horizontal with the sliding movement of the parallel guard doors, and
 (c) the rod has a plurality of ports, one for each guard door.

6. The guard door assembly for a machine tool as set forth in claim 5, wherein:
 (a) a plurality of sleeve members are disposed on the activating rod member and each one is individually associated with a given guard door.

7. A machine tool guard door sensing assembly, comprising:
 (a) a machine tool having a plurality of horizontally movable guard doors
 (b) an elongated rod having a through central passage which is disposed parallel to the line of movement of the slidable guard doors
 (c) a single sleeve member associated with each guard door and individually movable therewith
 (d) each of the sleeve members being disposed on the activating rod member, and
 (e) a port on the rod connected to the central passage and disposed so as to be covered by a sleeve member when that sleeve member is disposed in the closed position for its guard door.

8. The machine tool guard door sensing assembly as set forth in claim 7, wherein:
 (a) the sleeve member freely floats on the elongated rod, and
 (b) a bracket connected to the guard door is in contact with its corresponding sleeve member for moving it along the rod.

* * * * *